(12) United States Patent
Ueda

(10) Patent No.: US 7,218,329 B2
(45) Date of Patent: May 15, 2007

(54) DRAWING TOOL AND DRAWING METHOD

(75) Inventor: Jun Ueda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 149 days.

(21) Appl. No.: 10/520,790

(22) PCT Filed: Mar. 5, 2003

(86) PCT No.: PCT/JP03/02580

§ 371 (c)(1),
(2), (4) Date: Jan. 11, 2005

(87) PCT Pub. No.: WO2004/079662

PCT Pub. Date: Sep. 16, 2004

(65) Prior Publication Data

US 2005/0219254 A1  Oct. 6, 2005

(51) Int. Cl.
*G09G 5/00* (2006.01)

(52) U.S. Cl. .................. 345/619; 345/581; 715/526

(58) Field of Classification Search .............. None
See application file for complete search history.

(56) References Cited

U.S. PATENT DOCUMENTS 5,848,429 A * 12/1998 McEntee et al. ............ 715/515

6,184,879 B1  2/2001 Minemura et al.

FOREIGN PATENT DOCUMENTS

JP  8-202857 A  8/1996

OTHER PUBLICATIONS

Author: Ted Alspach, Title: Illustrator 8 Bible, Date: 1999, Publisher: IDG Books Worldwide, Inc., pp. 38-39, 48-51.*
CorelDraw 7, Das Kompendium, Markt & Technik, 1999, pp. 20-29, 36, 37, 45, 141, 147-149, 153, 193-195, 301, 342, 343 and 908-909; pHB.
Das große Auto CAD-Buch, Data Becker, 1990, pp. 16,17, 19, 29-31, 293-295, 768-771 and 880 pHB.

* cited by examiner

*Primary Examiner*—Mark Zimmerman
*Assistant Examiner*—David Chu
(74) *Attorney, Agent, or Firm*—Sughrue Mion, PLLC

(57) ABSTRACT

A drawing tool for drawing pattern parts with held attributes is provided. It draws pattern parts, based only on a desired pattern part being selected from a pattern part window, and the pattern part passing, along a route in which the pattern part moves with dragged onto a drawing canvas, through a desired attribute display region of attribute palettes for displaying its attributes given with respect to the pattern part, so that the attribute can be selected and set by the pattern part only passing, along the route in which an attribute of the pattern part drawn on the drawing canvas is dragged and dropped onto the drawing canvas, through the attribute display region for displaying the desired attribute; therefore, drawings can be performed by minimal operation.

7 Claims, 5 Drawing Sheets

FIG. 4

| ID | SHAPE | POSITION | SIZE | PAINTING COLOR | OUTLINE THICKNESS |
|---|---|---|---|---|---|
| 8 | QUADRANGULAR | – | 20 | YELLOW | THIN |

| ID | SHAPE | POSITION | SIZE | PAINTING COLOR | OUTLINE THICKNESS |
|---|---|---|---|---|---|
| 1 | QUADRANGULAR | 100, 500 | 50 | RED | THICK |

| ID | SHAPE | POSITION | SIZE | PAINTING COLOR | OUTLINE THICKNESS |
|---|---|---|---|---|---|
| 1 | QUADRANGULAR | 100, 500 | 50 | RED | THICK |
| 2 | CIRCULAR | 300, 200 | 20 | YELLOW | THIN |
| ... | ... | ... | ... | ... | ... |
| 7 | TRIANGULAR | 100, 600 | 40 | BLUE | REGULAR |

10b

DRAWING TOOL AND DRAWING METHOD

TECHNICAL FIELD

The present invention relates to drawing tools and methods for drawing by pattern parts being dragged and dropped onto canvas using a pointing device.

BACKGROUND ART

Conventional general-use drawing tools are configured such that they include pattern part windows in which pattern parts are selected by users, canvas onto which drawing is performed with the selected pattern parts being dragged and dropped, and palettes in which pattern part attributes are changed. The number of the palettes equals to the number of changeable attributes that the pattern parts have. An example of the conventional drawing tools is disclosed in Japanese Laid-Open Patent Publication 21,377/1998.

In the conventional drawing tools, any one of the pattern parts is selected from the pattern part window using a mouse, and the selected pattern part is placed in a desired position of the canvas with a drag-and-drop operation by the mouse. The placed pattern part attributes are generally predetermined ones as a set of standards, or the ones that have been selected and stored in the last operation. For example, in a state in which a red color has been selected in the color palette and a thick line has been selected in the line thickness palette in the last operation, when a quadrangular pattern part is selected in the pattern part window using the mouse, and then dragged and dropped on the canvas by the mouse, a quadrangular pattern is drawn onto the canvas, in which the painted color is red and the outline is thick.

In a case in which attributes need to be changed, the attributes are changed by palette selecting operations corresponding to each attribute, for example, a pattern part whose attribute needs to be changed, is selected using the mouse, and in the state in which the pattern has been selected, a painting color is then selected, if needed, from the color palette and an outline thickness is selected from the line thickness palette. For example, in a case in which a quadrangular pattern painted red on the canvas with a thick outline is changed to the one painted yellow with a thin outline, the operation must be performed in such a way that the quadrangular pattern is selected using the mouse at first, and then the yellow color is selected from the color palette in this state, and the thin line is selected from the line thickness palette.

In the conventional drawing tools, patterns are drawn onto the canvas by repeating these series of operations. That is, the conventional drawing tools have separate operations, which are the drag-and-drop operations that determine the positions of the patterns drawn and the palette selecting operations that determine how to draw the patterns.

In the conventional drawing tools, as described above, drawing operations have been performed by repeating operations in such a way that after having selected the pattern parts using the mouse and once placed them on the canvas by the drag-and-drop operations, their attributes are then changed. Therefore, in the conventional tools, in order to draw a pattern part, drag-and-drop operations for selecting desired pattern parts and for determining their positions, must be performed plural times, which equal to the number of the palettes corresponding to attributes to be changed; consequently, there has been a problem in that the operations are very troublesome.

An objective of the present invention, which has been made to solve the foregoing problem accordingly, is to provide a drawing tool and a drawing method in which operations for selecting and determining the attributes are simplified.

DISCLOSURE OF THE INVENTION

The present invention is to provide a drawing tool that includes: drawing canvas for drawing pattern parts; a pattern part window for displaying a plurality of the pattern parts being a candidate set for drawing; a pointing device for dragging and dropping any one, selected from the pattern part window, of the pattern parts; an attribute palette having a plurality of attribute display regions for displaying attributes selectively given with respect to the selected pattern part; an attribute detection means for detecting in the attribute palette an attribute display region through which the pointing device has passed along a route in which the selected pattern part is dragged and dropped onto the drawing canvas using the pointing device; an attribute hold means for holding an attribute that is selectively determined corresponding to the detected attribute display region; and a drawing means for drawing, by the selected pattern part being dropped onto the drawing canvas, the pattern part having the held attribute.

Consequently, because the attribute can be selected and set based only on the pattern part passing, along a route in which the attribute of the pattern part drawn on the drawing canvas is dragged and dropped onto the canvas, through an attribute display region for displaying a desired attribute, drawings can be performed by minimal operation. That is, by an operation in which the pattern part is dragged and dropped onto the canvas from the pattern part window, the position where the pattern part is drawn on the canvas can be determined, and the attribute to be drawn can be also selected and determined.

Moreover, the present invention is to provide a drawing tool that includes a pattern part window provided on a perimeter portion of the drawing canvas, and an attribute palette provided inward of the pattern part window in the drawing canvas.

Consequently, the attribute can be selected and determined, with a small move distance along a route in which the pattern part drawn is dragged and dropped onto the canvas from the pattern part window.

Furthermore, the present invention is to provide a drawing method that includes the steps of selecting any one of pattern parts from a pattern part window for displaying a plurality of pattern parts being a candidate set for drawing; based only on the selected pattern part passing, along a route in which the selected pattern part is dragged using a pointing device to move the pattern part into a position in which the pattern part is drawn on a drawing canvas, through any of attribute display regions in an attribute palette having a plurality of the attribute display regions for displaying attributes selectively given with respect to the selected pattern part, detecting the attribute display region, and holding an attribute selectively determined corresponding to the detected attribute display region; and drawing the pattern part provided with the held attribute by the selected pattern part being moved and dropped into the position where the pattern part is drawn on the drawing canvas.

Consequently, because the attribute can be selected and set based only on the pattern part passing, along a route in which the attribute of the pattern part drawn on the drawing canvas is dragged and dropped onto the canvas, through an attribute display region for displaying a desired attribute, drawing can be performed by minimal operation. That is, by an operation in which the pattern part is dragged and dropped onto the canvas from the pattern part window, the position where the pattern part is to be drawn onto the canvas can be determined, and the attribute to be drawn can be also selected and determined.

BRIEF DESCRIPTION OF DRAWINGS

FIG. 4 is a view representing a state in which, when a pattern part is dragged and dropped from a pattern part window onto canvas, attributes of the pattern part are stored in a pattern-part-attribute temporary storage unit of a storage unit in the drawing tool according to the present invention;

FIG. 5 is a view representing a state in which, when a pattern part placed on the canvas is dragged and dropped, attributes of the pattern part are stored in the pattern-part-attribute temporary storage unit of the storage unit in the drawing tool according to the present invention;

FIG. 6 is a view representing states in which attributes of pattern parts drawn on the canvas are stored in a pattern-part-attribute storage unit of the storage unit in the drawing tool according to the present invention;

BEST MODE FOR CARRYING OUT THE INVENTION

Embodiment 1

Figure 1:
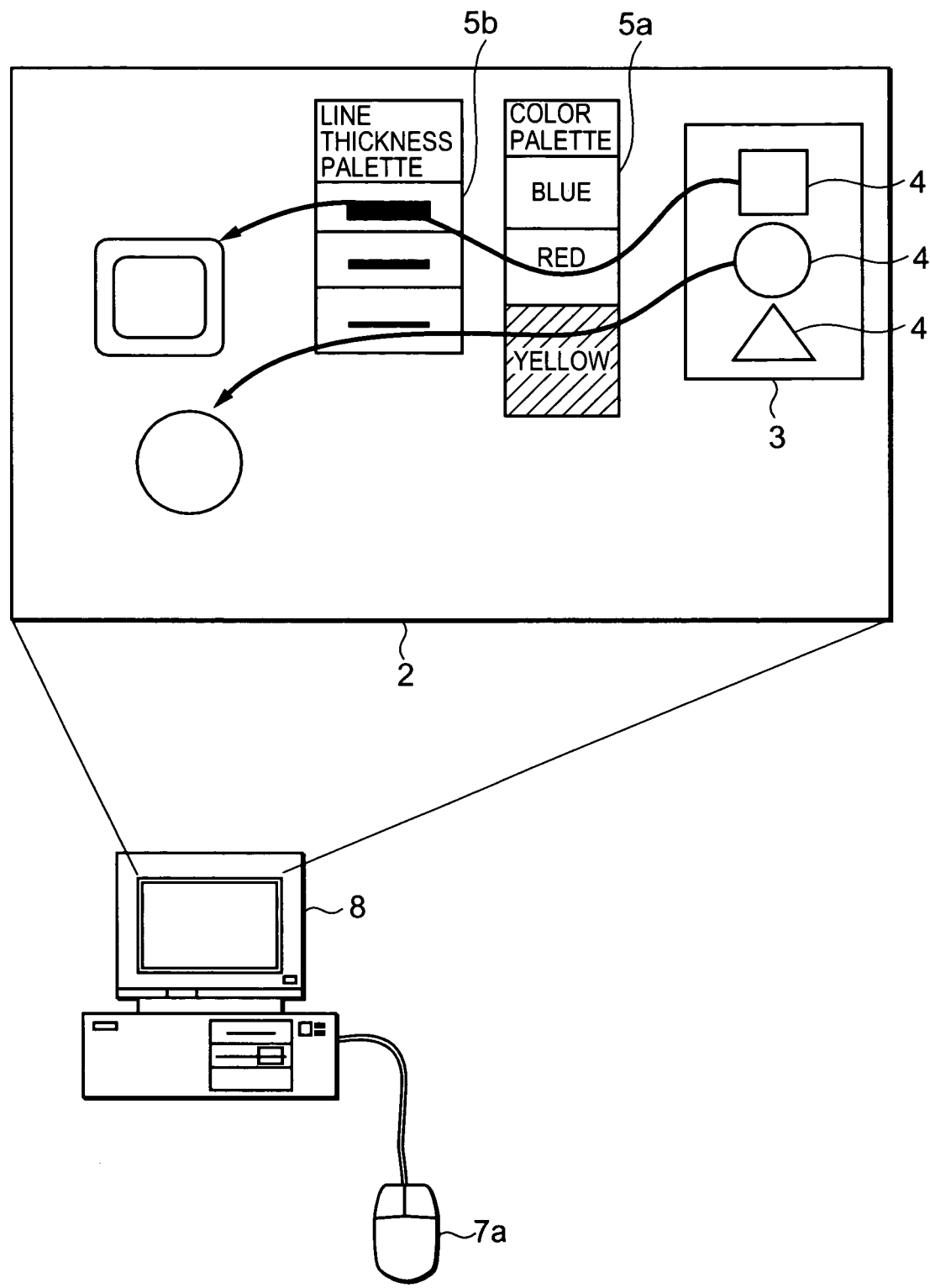
FIG. 1 is a system configurational view of a drawing tool according to the present invention.
Figure 2:
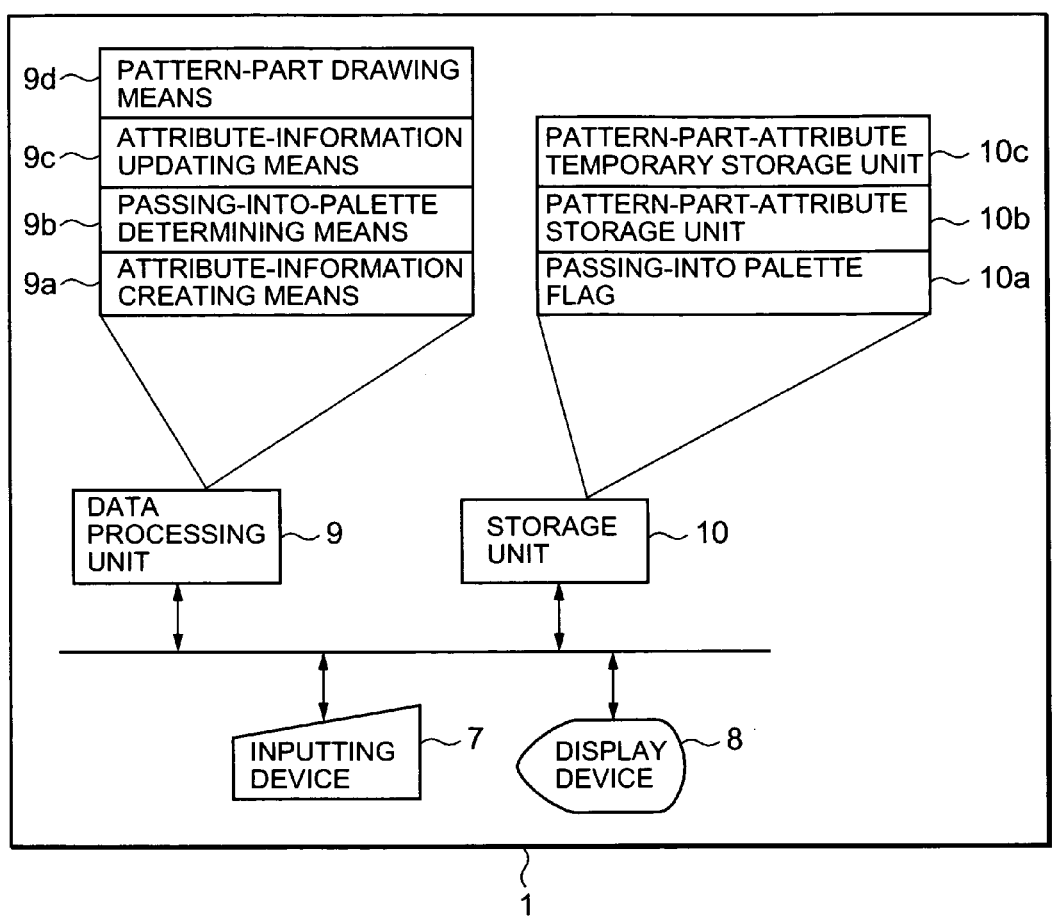
FIG. 2 is a circuit configurational view of the drawing tool according to the present invention.

A preferred embodiment will be explained using the figures. FIG. 1 is a schematic configurational view illustrating a drawing tool 1 in Embodiment 1 of the present invention, and FIG. 2 is a circuit block diagram of the drawing tool 1 illustrated in FIG. 1. As illustrated in FIG. 1 and FIG. 2, the drawing tool 1 in this embodiment has an inputting device 7 being a pointing device such as a mouse 7a, a display device 8 such as a CRT (cathode-ray tube), a data processing unit 9 for processing data in the drawing tool, and a storage unit 10 used for calculating in the data processing.

The data processing unit 9 includes: an attribute-information creating means 9a for storing attribute information of pattern parts in a pattern-part-attribute temporary storage unit 10c that will be explained later, when a user has started to drag and drop pattern parts 4 from a pattern part window 3 onto drawing canvas (hereinafter conveniently referred to as canvas) 2 using the mouse 7a; a passing-into-palette determining means 9b for determining whether the pointer of the mouse 7b is in a color palette 5a or a line thickness palette 5b (hereinafter conveniently referred to as palettes 5 or palettes) 5; an attribute-information updating means 9c for updating attribute information of a pattern when the pattern passes through the palette 5; and a pattern-part drawing means 9d for drawing a pattern part 4 on the canvas 2, at the point when the pattern part 4 is dragged and dropped onto the canvas 2 except for the palettes 5 portion. In addition, the storage unit 10 includes: a passing-into palette flag 10a for holding whether the pointer of the mouse 7a is in the palettes 5; a pattern-part-attribute storage unit 10b for holding attribute information of all patterns drawn on the canvas 2; and the pattern-part-attribute temporary storage unit 10c temporarily used for holding attributes in the palettes 5 where the pointer of the mouse 7a has passed through, when the pointer has passed through the palettes in an operation process in which a pattern part 4 is dragged.

Figure 3:
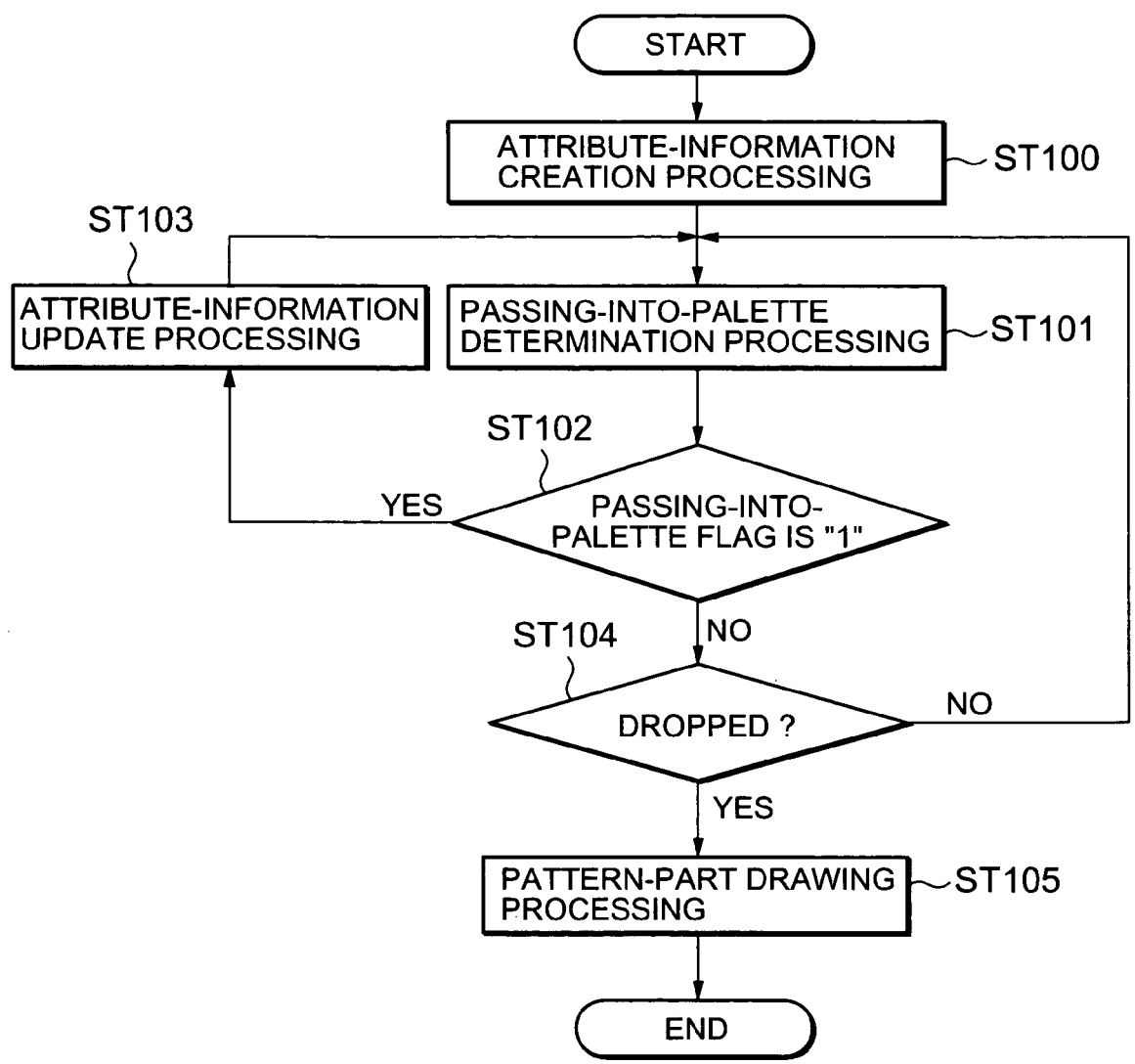
FIG. 3 is a flowchart illustrating an operation of the drawing tool according to the present invention.

The whole operation of the drawing tool in this embodiment will be explained using a flowchart illustrated in FIG. 3. FIG. 3 is the flowchart in a case when the user selects a pattern part 4 in the pattern part window 3, and drags and drops the pattern part onto the canvas 2 through the palettes 5.

Here, in this embodiment, a case in which selectable attributes are assumed to have two items, which are color and outline thickness will be explained.

When the user selects any one of the pattern parts 4 and moves the selected pattern part 4 from the pattern part window 3 by a drag operation, in attribute-information creation processing step ST100, information related to its pattern is stored in the pattern-part-attribute temporary storage unit 10c by the attribute-information creating means 9a. The pattern-part-attribute temporary storage unit 10c includes an ID (identifier), shape, position, size, painting color, and outline thickness, as represented in FIG. 4 and FIG. 5. The ID is a numerical value uniquely given to the pattern. The shape is an outline in which the pattern part 4 is drawn onto the canvas 2, and the position is given by coordinates where the pattern part 4 is drawn onto the canvas 2. Moreover, the size represents a length of one of sides when the pattern is quadrangular or triangular, or represents a diameter when the pattern is circular. The painting color represents color inside the pattern when the pattern part 4 is drawn onto the canvas 2, and the outline thickness represents an outline thickness of the pattern when the pattern part 4 is drawn onto the canvas 2.

The size drawn is predetermined depending on the type of the pattern when the pattern part 4 is dragged and dropped onto the canvas 2 from the pattern part window 3; for example, in a case of the quadrangular pattern the size is 20.

In attribute-information creation processing step 100, the attribute-information creating means 9a creates and stores the ID, size, shape, painting color and outline thickness, but not store the position.

An ID given to a pattern-part-attribute of the pattern 4 that is newly dragged is set to the maximum value, among the numerical values of IDs that have been already stored in the pattern-part-attribute storage unit 10b on the canvas, plus one, as represented in FIG. 6. A painting color and an outline thickness that have been selected in each palette 5 at the moment when dragging operation has been performed are stored.

FIG. 4 is an example representing how a pattern-part-attribute is stored in the pattern-part-attribute temporary storage unit 10c, when the pattern part 4, in a case in which "yellow" and "thin" are selected in the color palette 5a and the line thickness palette 5b, respectively, is selected and dragged-and-dropped onto the canvas 2. In addition, in such a case, because the maximum value of the IDs provided to the pattern parts already having been drawn is 7 according to FIG. 6, the ID provided to this new part becomes 8 (=7+1). In FIG. 4, specific data has not yet been stored in a position data box.

Figure 7:
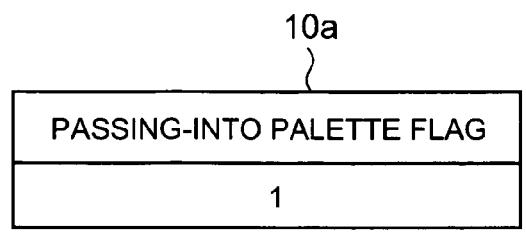
FIG. 7 is a view representing a state in which information as to whether a pointer of a mouse passes into an attribute palette is stored in a passing-into palette flag of the storage unit in the drawing tool according to the present invention.

Next, in passing-into-palette determination processing step ST101, it is determined by the passing-into-palette determining means 9b whether the pointer of the mouse 7a has passed into either of the coordinates of the palettes 5. The determination result is stored in the passing-into-palette flag 10a represented in FIG. 7 in passing-into-palette determination processing step ST101. As a value of the passing-into-palette flag 10a, in a case in which the pointer of the mouse 7a is in either of the palettes 5, "1" is stored, while in a case being in neither of the palettes 5, "0" is stored. Because "1" is stored in FIG. 7, it represents the case in which the pointer of the mouse 7a is in either of the palettes 5.

Consequently, at the time when the user starts to drag the pattern part 4 from the pattern part window 3, the value of the passing-into-palette flag 10a is "0".

Figure 8:
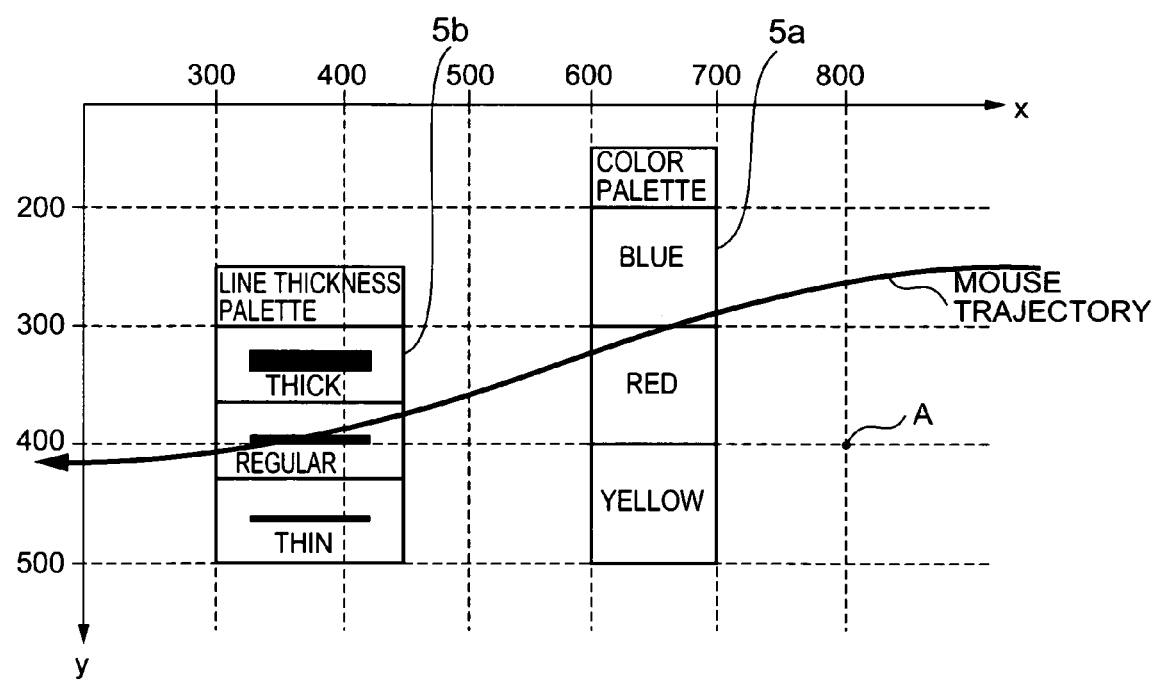
FIG. 8 is a view for explaining a state in which the pointer of the mouse passes through the attribute palette in the drawing tool according to the present invention.

In passing-into-palette determination processing step ST101, the determination processing as to whether the pointer of the mouse 7a has passed into the palette coordinates, is performed by judging whether the x-coordinate and y-coordinate of the mouse 7a have been in the x-coordinate and y-coordinate of the palette. For example, as illustrated in FIG. 8, when the pointer of the mouse 7a on the coordinates of the drawing tool points that the x-coordinate is 800 and the y-coordinate is 400 (point "A" in FIG. 8), the coordinates on the color palette 5a are assumed that the x-coordinate is 600–700 and the y-coordinate is 200–500. Comparing the y-coordinate of the pointer of the mouse 7a with the y-coordinate on the color palette 5a , the y-coordinate of the pointer of the mouse 7a is in the range of the y-coordinate on the color palette 5a however, the x-coordinate of the pointer of the mouse 7a is out of the range of the x-coordinate on the color palette 5a.

As represented in step ST102, in a case in which either or both of the x-coordinate and y-coordinate of the pointer of the mouse 7a are out of the range of the x-coordinate or y-coordinate of a palette 5, the pointer of the mouse 7a is judged not to have passed into the palette coordinates, and the value of the passing-into palette flag becomes "0". In a case in which both of the x-coordinate and the y-coordinate of the pointer of the mouse 7a are in the range of the x-coordinate and the y-coordinate of the palette 5, the pointer of the mouse 7a is judged to have passed into the palette coordinates, the value of the passing-into palette flag becomes "1".

While the pointer of the mouse 7a is not on the palette 5, that is, while the value of the passing-into palette flag 10a is "0", the passing-into-palette determination processing in step ST101 continues until the pattern is dropped, that is, until the dropping is detected in step ST104.

When the pointer of the mouse 7a has passed into the coordinates of the color palette 5a, that is, when the passing-into palette flag 10a is "1", attribute-information update processing in step ST103 continues. In attribute-information update processing step ST103, the attribute-information updating means 9c updates information as to how the pattern part 4 is drawn, when the pattern part 4 is dropped onto the canvas 2 based on the coordinates where the pointer of the mouse 7a has passed through the palette 5.

As represented in FIG. 8, for example, in a case in which the pointer of the mouse 7a have passed into the portion corresponding to the attribute being "red" in the attribute display portion of the color palette 5a, "1" is stored in the passing-into palette flag 10a in passing-into-palette determination processing step ST101, then the painting color in the pattern-part-attribute temporary storage unit 10c is updated from "yellow" to "red".

After this, if the pointer of the mouse 7a moves out from the color palette 5a without passing through any portion except for the attribute display portion being "red", in passing-into-palette determination processing step ST101, "0" is stored in the passing-into palette flag 10a.

If the pointer of the mouse 7a has passed through the "blue" portion of the color palette 5a, after once having passed through the "red" portion, and has passed out from the color palette 5a, the painting color of the pattern-part-attribute temporary storage unit 10c is updated from "red" to "blue" in step ST103. In FIG. 8, an example is illustrated in which the pointer of the mouse 7a has only passed through the "red" portion of the color palette 5.

After this, in a case in which the pointer of the mouse 7a passes into the coordinates of the line thickness palette 5b, the passing-into palette flag 10a becomes "1" in step ST101, the attribute-information update processing in step ST103 continues. For example, as illustrated in FIG. 8, in a case in which the pointer of the mouse 7a passes into the coordinates of the line thickness palette 5b, because the pointer of the mouse 7a passes into a portion corresponding to the attribute being "regular" among the attribute display portion in the line thickness palette 5b, the outline thickness of the pattern-part-attribute temporary storage unit 10c is updated from "thin" to "regular" in step ST103.

Then, if the pointer of the mouse 7b has not passed through portions except for the "regular" of the attribute display portion and has passed out from the line thickness palette 5b, "0" is stored in the passing-into palette flag 10a in step ST101; consequently, processing in step ST101, step ST102, and step ST104 is repeated until the pattern part 4 under being dragged is dropped or passes again into the palette 5.

In a case in which the user passes the pattern part 4 through the "red" portion of the color palette 6a and the "regular" portion of the line thickness palette 5b, and drops the pattern part 4 onto the canvas 2, a pattern-part drawing processing in step ST105 is performed.

In pattern-part drawing processing step ST105, by the pattern-part drawing means 9d, the pointer coordinates of the mouse 7a at the time when the pattern part 4 is dropped onto the canvas 2 are inputted into the pattern-part-attribute temporary storage unit 10c, and the pattern is drawn onto the canvas 2 based on the information of the pattern-part-attribute temporary storage unit 10c. After drawing, the pattern-part drawing means 9d adds the contents of the pattern-part-attribute temporary storage unit 10c to the pattern-part-attribute storage unit 10b.

The processing flow of a case has been explained above in which the user selects the pattern part 4 in the pattern part window 3, passes it through the palettes 5, and drags and drops onto the canvas 2; however, in a case in which the pattern part 4 does not pass through the palettes 5, the flow becomes as follows.

Similarly to the case in which the pattern part 4 passes through the palettes 5, when the user has moved the pattern part 4 from the pattern part window 3 by the drag operation, information related to the pattern is stored in the pattern-part-attribute temporary storage unit 10c.

In passing-into-palette determination processing step ST101, it is determined whether the pointer of the mouse 7a has passed into the coordinates of the palettes 5; here, the value of the passing-into palette flag 10a is "0" because the pointer of the mouse 7a does not pass through the palettes 5.

At this moment, the pattern-part-attribute temporary storage unit 10c stores the ID, shape, size, painting color and outline thickness, but not store the position. In this case, the painting color and the outline thickness are made to be the predetermined ones as the standard set, or the selected and stored ones in the last operation.

When a pattern is dropped in step ST104, the pattern-part drawing process in step ST105 is performed. The pointer position of the mouse 7a at its dropped point is inputted into the pattern-part-attribute temporary storage unit 10c, and the pattern is drawn onto the canvas 2 based on the information of the pattern-part-attribute temporary storage unit 10c. After the pattern has been drawn, the contents of the pattern-part-attribute temporary storage unit 10c are added to the pattern-part-attribute storage unit 10b.

Next, a processing flow of the case will be explained in which the attributes of the pattern part 4 already placed on the canvas 2 are changed.

As an example, a processing flow is represented as to a case in which the attributes of the pattern in which the ID in the pattern-part-attribute storage unit 10b, as represented in FIG. 6, is "1", that is, the attributes of the quadrangular pattern part in which the painting color is "red" and the outline thickness is "thick", are changed. It is assumed that this quadrangular pattern has a side-length of 50 and is drawn at the point where the x-coordinate is "100" and the y-coordinate is "500".

In a case in which the user moves a pattern whose ID is "1" and that is placed on the canvas 2 by a drag operation, in attribute-information creation processing step ST100, information related to the pattern, that is, information related to the pattern part whose ID is "1", in the pattern-part-attribute storage unit 10b, is copied into the pattern-part-attribute temporary storage unit 10c. That is, differing from the case of the pattern part 4 being dragged from the pattern part window 3, as represented in FIG. 5, the ID, shape, size, painting color, and outline thickness in the pattern-part-attribute temporary storage unit 10c become those already stored in the pattern-part-attribute storage unit 10b. The position is not stored.

In passing-into-palette determination processing step ST101, it is determined whether the pointer of the mouse 7a, in a state in which the user drags the pattern part 4 already drawn, has passed into the coordinates of the palettes 5. At the time when the user starts to drag the pattern part 4 onto the canvas 2, the value of the passing-into palette flag 10a is "0".

When the pointer of the mouse 7a is not in the palettes 5, that is, when the value of the passing-into palette flag 10a is "0", the passing-into-palette determination processing in step ST101 continues until any one of the patterns is dropped in step ST102 and step ST104.

For example, when the pointer of the mouse 7a passes into the coordinates of the color palette 5a, that is, when the value of the passing-into palette flag 10a is "1", similarly to the case in which a pattern part 4 is dragged and dropped from the pattern part window 3 onto the canvas 2, the attribute-information update processing in step ST103 is performed.

For example, if it is assumed that the pointer of the mouse 7a has passed into the "blue" region in the color palette 5a, the painting color in the pattern-part-attribute temporary storage unit 10c is updated from "red" to "blue". After this operation, if the pointer of the mouse 7a has passed out from the color palette 5a without passing into regions other than the "blue" region of the color palette 5a, processes in step ST101, step ST102, and step ST104 are repeated unless the value of the passing-into palette flag becomes "0" in passing-into-palette determination processing step ST101, and the pattern part is dropped or the pointer passes into the palette again.

In a case in which the user has dropped the pattern part 4 onto the canvas 2 after having passed the pointer through the "blue" region in the color palette 5a, the pattern-part drawing processing in step ST105 is performed.

In pattern-part drawing processing step ST105, a pointer position of the mouse 7a, when the pattern is dropped, is inputted into the pattern-part-attribute temporary storage unit 10c, and based on the information in the pattern-part-attribute temporary storage unit 10c, the pattern is drawn onto the canvas 2. After drawing, the contents in the pattern-part-attribute temporary storage unit 10c are overwritten on a line of the pattern-part-attribute storage unit 10b having the same ID as that of the pattern-part-attribute temporary storage unit 10c. In this example, because the ID of the pattern-part-attribute temporary storage unit 10c is "1", the contents in the pattern-part-attribute temporary storage unit 10c are overwritten on the line of the pattern-part-attribute storage unit 10b whose ID is "1".

Here, in the above described explanation, it has been described in the case where a simple pattern such as a quadrangular pattern or circular pattern has two attributes, which are the painting color and outline thickness; however, it is understood that the invention is not limited to shapes or kinds of the attributes of patterns as far as the patterns have attributes, and that the invention can be utilized in various kinds of drawing tools. It is also understood that not only "figures" such as a quadrangle or circle but also characters, etc., as pattern parts, can be handled. For example, in a case in which characters as the pattern parts are handled, attributes such as a kind of fonts, font size, underline, fat character, and italic character as the palette can be set by once-time drag-and-drop operation.

According to the present invention as described above, when the pattern part is selected from the pattern part window, and dragged and dropped onto the drawing canvas, because a means of selecting and determining the pattern part attributes drawn onto the drawing canvas is provided by the pattern part passing through the desired attributes in the palette, the drawing can be performed with minimal operation. That is, by one single operation in which the pattern part is dragged and dropped from the pattern part window onto the canvas, the position where the pattern part is drawn onto the canvas is determined, and, at the same time, the attributes drawn can be selected and determined.

INDUSTRIAL APPLICABILITY

As described above, a drawing tool and drawing method according to the present invention is suitably used for drawing in which attributes related to a plurality of items with respect to a pattern part need to be selected.

What is claimed is:

1. A drawing tool comprising:
a drawing canvas for drawing at least one pattern part;
a pattern part window for displaying a plurality of pattern parts, wherein the pattern parts are candidates to be drawn on the drawing canvas;

a pointing device for dragging and dropping at least one pattern part, wherein the at least one pattern part is selected from the plurality of pattern parts displayed on the pattern part window;

an attribute palette comprising a plurality of attribute display regions for displaying attributes selectively given with respect to the selected pattern part;

an attribute detection means for detecting in the attribute palette an attribute display region through which the pointing device has passed along a route in which the selected pattern part is dragged and dropped onto the drawing canvas using the pointing device;

an attribute hold means for holding an attribute that is selectively determined to correspond to the detected attribute display region; and a drawing means for drawing the pattern part having the held attribute by dropping the selected pattern part onto the drawing canvas.

2. A drawing tool as recited in claim 1, wherein the pattern part window is provided on a perimeter portion of the drawing canvas, and the attribute palette is provided inward of the pattern part window in the drawing canvas.

3. A drawing method comprising the steps of: selecting at least one pattern part from a plurality of pattern parts on a pattern part window, wherein the pattern part window display a plurality of pattern parts which are candidates to be drawn;

based only on the selected pattern part passing, along a route in which the selected pattern part is dragged using a pointing device which moves the pattern part into a position in which the pattern part is drawn onto a drawing canvas, through any of attribute display regions in an attribute palette comprising a plurality of the attribute display regions for displaying attributes selectively given with respect to the selected pattern part, detecting the attribute display region, and holding an attribute selectively determined to correspond to the detected attribute display region; and drawing the pattern part provided with the held attribute by the selected pattern part being moved and dropped into the position where the pattern part is drawn onto the drawing canvas.

4. The drawing tool according to claim 1, wherein the pattern part window and the attribute palette are separately provided on the drawing canvas.

5. The drawing tool according to claim 1, wherein the attribute detection means detects the attribute display region through which the pointing device has passed along a route from the pattern part window to the drawing canvas.

6. The drawing tool according to claim 1, further comprising a plurality of attribute palettes each comprising different attributes of a pattern part.

7. The drawing tool according to claim 1, wherein an attribute of a pattern part is modified by dragging the pointing device through the attribute in the attribute palette.

* * * * *